(12) United States Patent
Case

(10) Patent No.: US 10,497,104 B2
(45) Date of Patent: Dec. 3, 2019

(54) EMPIRICAL EXPOSURE NORMALIZATION

(71) Applicant: Adobe Inc., San Jose, CA (US)

(72) Inventor: Richard Case, Hamburg (DE)

(73) Assignee: Adobe Inc., San Jose, CA (US)

(*) Notice: Subject to any disclaimer, the term of this patent is extended or adjusted under 35 U.S.C. 154(b) by 56 days.

(21) Appl. No.: 15/791,500

(22) Filed: Oct. 24, 2017

(65) Prior Publication Data

US 2019/0122347 A1 Apr. 25, 2019

(51) Int. Cl.
*G06K 9/40* (2006.01)
*G06T 5/00* (2006.01)
*H04N 5/232* (2006.01)
*G06T 5/50* (2006.01)

(52) U.S. Cl.
CPC ............ *G06T 5/009* (2013.01); *G06T 5/50* (2013.01); *H04N 5/23232* (2013.01); *G06T 2207/20016* (2013.01); *G06T 2207/20208* (2013.01); *G06T 2207/20221* (2013.01)

(58) Field of Classification Search
CPC . G06T 5/50; G06T 5/009; G06T 2207/20208; G06T 2207/20221; H04N 5/2355
See application file for complete search history.

(56) References Cited

U.S. PATENT DOCUMENTS

| 8,582,001 | B2 | 11/2013 | Tzur | |
|---|---|---|---|---|
| 9,819,849 | B1* | 11/2017 | Rivard | H04N 5/2256 |
| 2003/0096302 | A1* | 5/2003 | Yguerabide | C12Q 1/6816 |
| | | | | 435/7.1 |
| 2004/0036775 | A1* | 2/2004 | Watson, Jr. | G06T 5/50 |
| | | | | 348/207.1 |
| 2009/0102945 | A1 | 4/2009 | Chen | |
| 2010/0309333 | A1* | 12/2010 | Smith | H04N 5/235 |
| | | | | 348/230.1 |
| 2011/0090361 | A1 | 4/2011 | Kobsyshai | |

(Continued)

OTHER PUBLICATIONS

Hasinoff, Samuel W., et al., "Noise-Optional Capture for High Dynamic Range Photography", In IEEE Conference on Computer Vision and Pattern Recognition, Jun. 2010, 9 pages.

(Continued)

*Primary Examiner* — Bhavesh M Mehta
*Assistant Examiner* — Ian L Lemieux
(74) *Attorney, Agent, or Firm* — Kilpatrick Townsend & Stockton LLP

(57) ABSTRACT

An automated process empirically normalizes a "dark" image by adjusting the apparent exposure to compensate for nonlinearity in the luminance response of the image sensor. The process includes receiving at least two digital images, one of the digital images having an exposure value that is greater than that of another of the digital images. A reduced-resolution pair of images is produced from the at least two digital images. At least one representative scale factor is calculated from tonal values in the two images and at least one empirical scale factor is determined by selective interpolation between the representative scale factor and a comparative scale factor. The empirical scale factor is used in a function applied pixelwise to the darker of the digital images to produce an empirically normalized digital image.

20 Claims, 6 Drawing Sheets

(56) References Cited

U.S. PATENT DOCUMENTS

| | | |
|---|---|---|
| 2012/0218442 A1* | 8/2012 | Jandhyala ................. G06T 5/50 |
| | | 348/239 |
| 2013/0235232 A1 | 9/2013 | Yang |
| 2013/0322739 A1* | 12/2013 | Paris ........................ G06K 9/62 |
| | | 382/155 |
| 2014/0307129 A1 | 10/2014 | Feng |
| 2015/0170346 A1* | 6/2015 | Hamburg ................. G06T 5/009 |
| | | 382/274 |
| 2015/0358646 A1* | 12/2015 | Mertens ............... H04N 1/6058 |
| | | 382/166 |
| 2017/0026594 A1 | 1/2017 | Shida |
| 2017/0171446 A1 | 6/2017 | Nashizawa |
| 2017/0278546 A1 | 9/2017 | Xiao |
| 2017/0332060 A1 | 11/2017 | Chan |
| 2018/0041682 A1 | 2/2018 | Zhang |

OTHER PUBLICATIONS

Guthier, Benjamin, et al., "Optimal Shutter Speed Sequences for Real-Time HDR Video", Imaging Systems and Techniques (IST), IEEE International Conference, Jul. 2012, 11 pages.

Guthier, Benjamin, et al., "Determining Exposure Values form HDR Histograms for Smartphone Photography", MM '13 Proceedings of the 21st ACM International Conference on Multimedia, Oct. 2013, 3 pages.

* cited by examiner

EMPIRICAL EXPOSURE NORMALIZATION

TECHNICAL FIELD

This disclosure relates generally to the field of digital image processing. More specifically, this disclosure relates to processing techniques to normalizing the exposure of a digital image.

BACKGROUND

The ready availability of camera technology, particularly in small, lightweight computing devices, has increased the prevalence of amateur photography. Hardware and imaging software in both computing devices and dedicated digital cameras have advanced so that photographers of all levels have access to highly advanced image processing that can be applied to images in many ways and at any time, even immediately after image capture on a device. One area in which image processing still sometimes falls short is when image processing is applied to images taken at or near the limits of the dynamic range of the imaging sensor being used. Such images might be taken, as an example, during exposure bracketing for high dynamic range ("HDR") photography or for image selection.

In order to adjust the exposure of such images during further processing, existing applications typically refer to exchangeable image file ("EXIF") data within the image files. EXIF data values are typically assigned based on camera settings assuming that the luminance response of a digital image sensor is linear, or nearly so. In practice however, most digital image sensors become nonlinear near their limits. For example, most digital image sensors are nonlinear in their response to light at levels that are very low relative to the sensor's native sensitivity. Thus, it is difficult to achieve optimum results when using the "dark" image of a series of images captured of a scene for image enhancement, for example, to form a combined image through HDR photography.

SUMMARY

A method of empirically normalizing the exposure value of a digital image includes receiving at least two digital images, one of the digital images having an exposure value that is greater than another of the digital images, the at least two digital images including at least some identical photographic content. A reduced-resolution pair of images is produced from the at least two digital images. At least a light tone representative scale factor is calculated from the reduced-resolution pair of images, and at least a light-tone empirical scale factor is calculated by selectively interpolating between the light-tone representative scale factor and a normal scale factor. An empirically normalized digital image is generated by applying, pixelwise, a function including the light-tone empirical scale factor to at least one of the at least two digital images.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
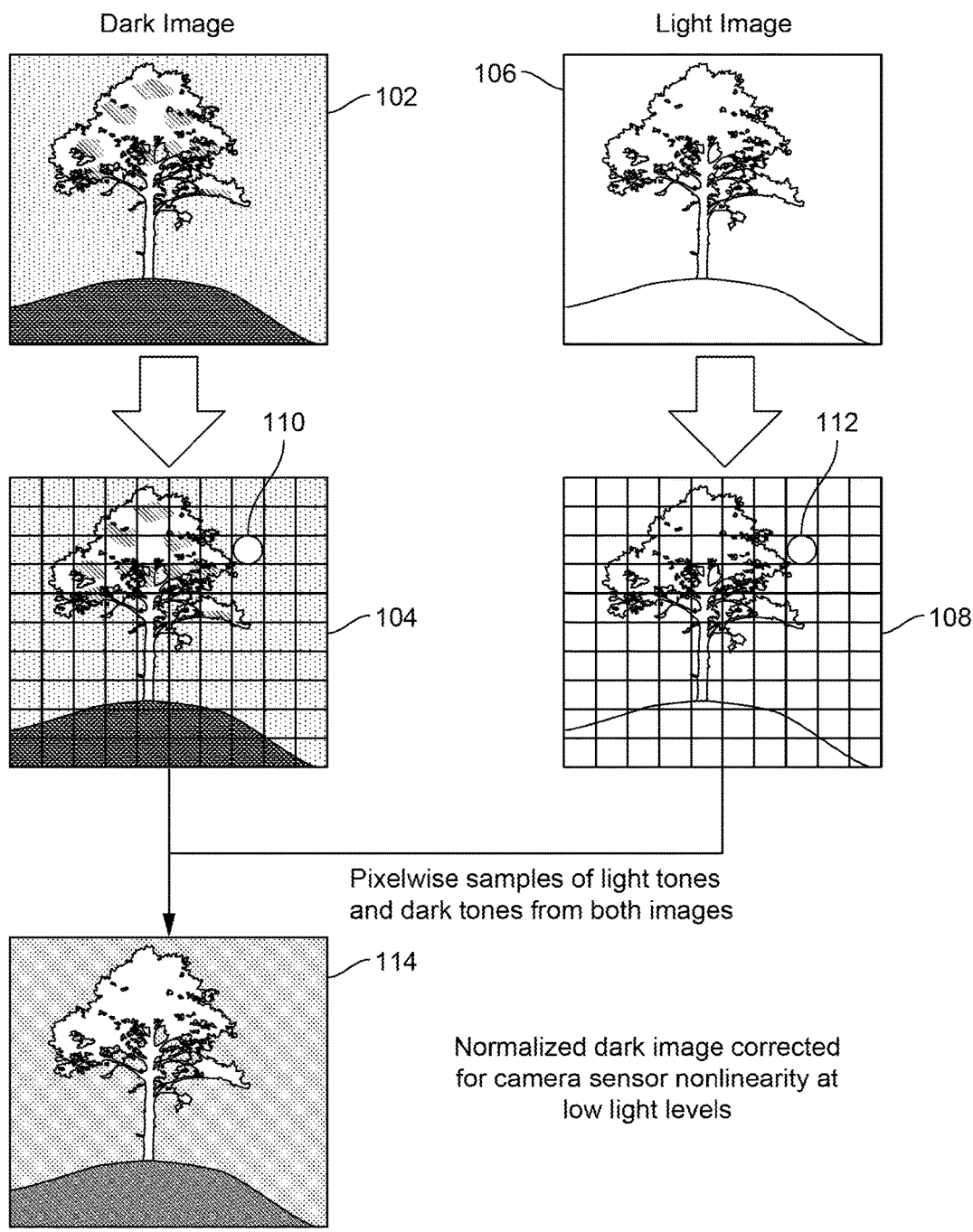
FIG. 1 is a schematic process diagram depicting an example of two digital images being processed to achieve empirical exposure normalization of the darker of the two images, according to certain embodiments.

When multiple digital photographs with differing exposure values are captured of a given scene, an image or images at or near the limits of the dynamic range of the imaging sensor may be exposed differently than camera settings would suggest. Such images might be taken, as an example, during exposure bracketing for high dynamic range (HDR) photography or for image selection. In particular, often a darker image is not exposed as expected because the darker image is captured such that the ambient light is in a luminance range for the image sensor where its luminance sensitivity is nonlinear.

Techniques are disclosed herein can address this issue by empirically normalizing the exposure of a digital image or digital images, thereby providing accurate results when working with multiple images of the same scene wherein each image has a different exposure value ("ev"). Such images can be created, for example, by changing at least one of the parameters in the "exposure triangle" of parameters, namely, sensitivity ("ISO"), focal ratio ("f-stop" or loosely "aperture") and time ("shutter speed") with each image capture. More particularly, the techniques discussed in the present disclosure provide an automated process for adjusting the apparent exposure of a "dark" image of a series of digital images to compensate for nonlinearity in the luminance response of the image sensor. Such an adjustment can make the dark image's exposure statistically fit more closely within a desired linear relationship of brightness across images as compared to relying on the dark image(s) as captured.

To appreciate a practical example of the automated process described herein, assume a camera, computer, or other electronic device receives two digital images taken with camera settings set to achieve relative exposure values for each digital image such that one image is darker than the other. These two digital images include at least some identical photographic content, for example, the two images are two images taken at about the same time of the same scene, the only major difference being exposure value. Such images might be captured during image bracketing or as part of an HDR process. The darker of the two digital images is brighter than expected based on the camera settings, and brighter than desired, because the camera sensor's luminance response is non-linear at low light levels. To correct the exposure of the dark image, a reduced-resolution pair of images is produced from the two digital images. Each of the images in the reduced-resolution pair is a copy of one of the original images, except that it has lower resolution. The processing device performing the various operations of the process calculates empirical scale factors using light and dark tone samples from both of the reduced-resolution images. Optionally, a camera sensor parameter describing at what light levels the camera sensor becomes non-linear in its luminance response can be used along with the tonal information from the reduced-resolution images to determine the empirical scale factors. A mathematical function of the empirical scale factors is applied to the darker of the two original digital images to produce an empirically normalized darker digital image, one with an apparent exposure value corresponding to the camera settings used to capture the original dark image, thus automatically cancelling out or compensating for the nonlinearity in the camera sensor luminance response.

Referring now to the drawings, FIG. 1 schematically illustrates the process described herein at a high level. Original dark digital image 102 is filtered (reduced in resolution) to produce a reduced-resolution dark image 104 of a reduced-resolution pair of images. Original light digital image 106 is filtered (reduced in resolution) to produce reduced-resolution light image 108 of the reduced-resolution pair of images. Reduced-resolution digital images 104 and 108 are substantially lower in resolution than original digital images 102 and 106, as can be appreciated by observing the blockier appearance of the reduced-resolution pair of digital images 104 and 108. Pairwise sets of pixels, such as pixel 110 and pixel 112 (size exaggerated for clarity), are sampled from throughout the reduced-resolution pair of images to produce a set of pairs of light-tonal values and a set of pairs of dark-tonal values from both digital images. These sets of tonal values are statistically processed to produce a "normalized" version 114 of the dark image. By "pairwise sets" of pixels, what is meant is that each pair of pixels in a set includes one pixel from each of the pair of reduced-resolution images, and each pixel of the pair represents the same visual point in the images. The image pair can be aligned prior to normalization, for example, by using common features.

"Exposure normalization" (or simply "normalization" in this context) of the darker of two images is understood to be applying a mapping to the pixels in the darker image such that the result is perceived to be, on average (discounting noise in the darker image and oversaturation in the brighter image), as bright as the brighter image. This mapping may take the non-linearity of the sensor response for very low light levels into account. If this mapping takes the non-linearity into account, it could also be used to "linearize" (relative to the light image) the sensor response at low light levels in the darker image by applying this mapping (after which the relative EV between the two images will be close to 0) and then uniformly dividing all pixels in the result by the light-tone empirical scale factor (after which the relative EV between the two images will be close to $\log_2$ (light-tone scale factor)). This linearization process will typically result in no noticeable change in the light tones and a slight darkening of the shadows, since the light-tone empirical scale factor is typically greater than the dark-tone empirical scale factor. After this linearization process, recomputing the relative response between the linearized dark image and the light image should now produce a mapping that if plotted would look closer to a straight line, as will be discussed later with respect to FIG. 6.

The following examples are provided to introduce the details of the present disclosure. In some examples, the described processes can be implemented by means of computer program instructions (or "code") executing on a processing device to cause the processing device to perform the methods described.

In one example, a processing device receives at least two digital images, one of the at least two digital images having an exposure value that is greater than another of the at least two digital images. The at least two digital images include at least some identical photographic content. A reduced-resolution pair of images is produced from the at least two digital images. A light-tone representative scale factor is calculated from the reduced-resolution pair of images, and a light-tone empirical scale factor is calculated by selectively interpolating between the light-tone representative scale factor and a normal scale factor. An empirically normalized digital image is generated by applying, pixelwise, a function including at least the light-tone empirical scale factor to at least one of the at least two digital images.

In one example, the function mentioned above includes a camera sensor parameter. In at least one example, the camera sensor parameter includes a luminance threshold for dark tones. If the luminance threshold for a particular camera sensor is unknown, it can be determined by iteratively correcting images from an initial guess until the resulting exposure normalization is optimal.

In one example, a dark-tone empirical scale factor is produced by calculating a dark-tone representative scale factor from the reduced-resolution pair of images and selectively interpolating between the light-tone representative scale factor and the dark-tone representative scale factor to produce the dark-tone empirical scale factor. The function that is applied to produce the empirically normalized digital image then includes both the light-tone empirical scale factor and the dark-tone empirical scale factor.

In one example, the calculating of the light-tone representative scale factor includes gathering a light-tone pairwise set of scale factors from the reduced digital images, and the calculating of the dark-tone representative scale factor includes gathering a dark-tone pairwise set of scale factors from the reduced-resolution pair of images.

As used herein, the term "camera" refers to an imaging device that is capable of capturing a photographic or video image. Unless otherwise indicated, a camera includes both specialized devices (e.g., devices with no general functions other than taking pictures) and multipurpose devices (e.g., devices, such as smart phones, that are capable of performing functions besides taking pictures). Examples of cameras include, but are not limited to, still-image cameras, video cameras, smartphones, tablet computing devices, webcams, security cameras, and other devices capable of capturing still images or motion footage.

As used herein, the terms "taking a picture," "capturing," or comparable phrases, refer to the act of capturing one or more digital images using a camera. In some embodiments, taking a picture occurs in response to a single user action. In some cases, multiple images are captured by a same camera at a same time, or substantially the same time, and the captured picture is based on more than one of the multiple images. The multiple images have exposure value, settings, or other differences in the camera's actions. The embodiments described herein can be readily applied to situations in which multiple images of different exposure values are being used.

As used herein, the terms "picture" and "photograph" refer to a media item including visual content captured with a camera by a photographer. Unless otherwise indicated, a picture can be based on multiple digital images.

As used herein, the term "digital image" means an electronic representation of photographic subject matter, such as by set of pixels. A digital image is of any suitable format, such as a bitmap or a JPEG file format. For convenience, digital images are referred to herein as having settings (e.g., a digital image with a high ISO setting). Unless otherwise indicated, this refers to digital images taken by cameras having the setting (e.g., a digital image taken by a camera having a high ISO setting). In some cases, digital images are received from a camera in response to a single user action, such as the action of taking a picture. Additionally or alternatively, digital images are received from a series of related images, such as video data.

As used herein, the terms "photographic content" and "content" refer to the subject matter of a picture or a digital image, unless otherwise indicated. It is to be understood that similar subject matter may have various appearances (or non-appearance) in various digital images. As used herein, the terms "ISO," "ISO setting," "sensitivity setting," and "light sensitivity setting" refer to a camera's sensitivity to available ambient light in the environment of the subject matter. A higher ISO (or higher sensitivity) indicates that a camera is more sensitive to the ambient light. Additionally or alternatively, a lower ISO (or lower sensitivity) indicates that the camera is less sensitive to the ambient light.

Figure 2:
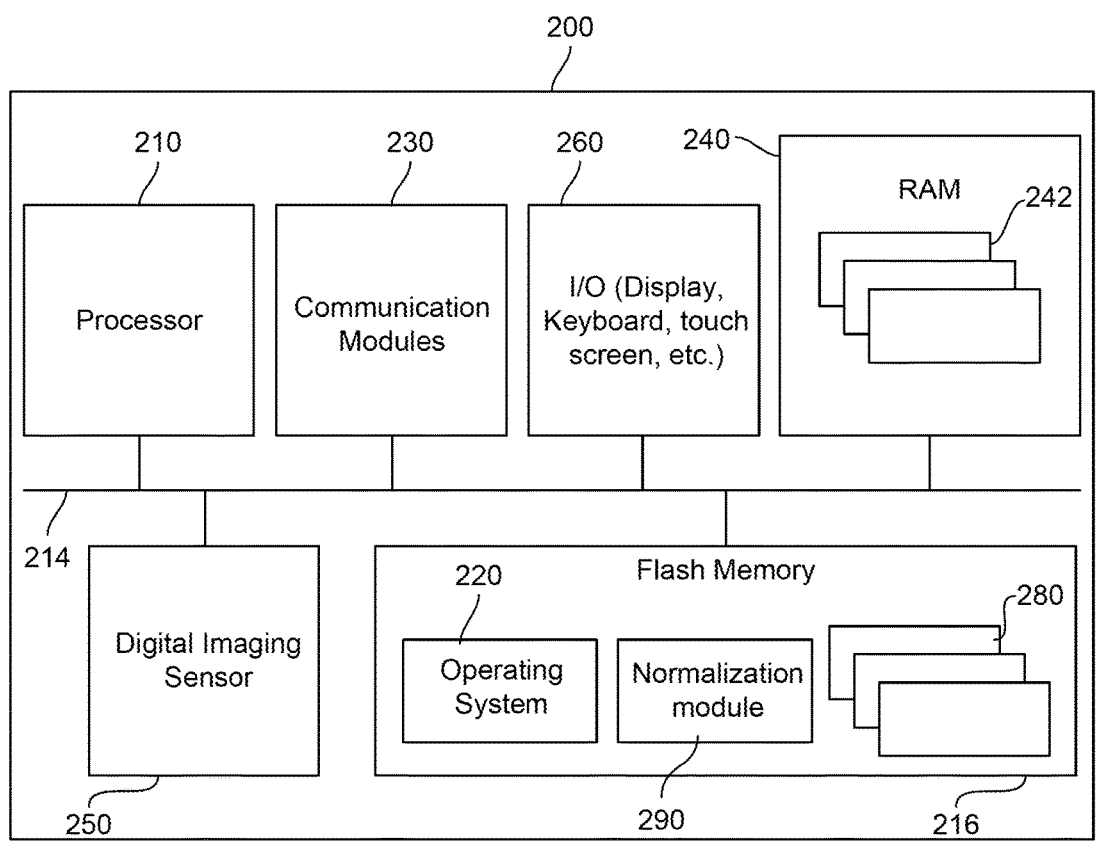
FIG. 2 is a block diagram schematically illustrating components of an example electronic device that is capable of empirical exposure normalization, according to certain embodiments.

FIG. 2 is a block diagram schematically illustrating selected components of an example electronic device 200 that includes digital camera functionality. Electronic device 200 may include, for example, one or more devices selected from a smartphone, a tablet computer, a laptop computer, a digital camera, or any other computing device capable of digitally recording an observed scene. A combination of different devices may be used in certain embodiments. In general, the various embodiments disclosed herein can be implemented in conjunction with a wide range of existing or subsequently developed hardware capable of capturing and displaying digital images. In FIG. 2, electronic device 200 includes, among other things, a processor 210, flash memory 216 an operating system 220, which at least partially resides in flash memory 216, a communication module or modules 230, a random access memory 240, and digital imaging sensor 250. As can be further seen, a bus and/or interconnect 214 is also provided to allow for inter- and intra-device communications using, for example, communication module 230.

Depending on the particular type of device used for implementation, electronic device 200 is optionally coupled to or otherwise implemented in conjunction with an input/output devices 260 such as one or more of a touch sensitive display, a speaker, a printer, an antenna for wireless data communication, a microphone, tactile buttons, and tactile switches. For example, in a particular alternative embodiment wherein electronic device 200 is implemented in the form of a tablet computer, certain functionality is provided in conjunction with a touch sensitive surface that forms part of the tablet computer. Electronic device 200 can optionally be coupled to a network to allow for communications with other computing devices or resources, such as networked image processing services and a networked image repository. However such network connection is optional, and therefore in certain embodiments, electronic device 200 can be understood as being capable of autonomously carrying out exposure normalization on images captured by digital imaging sensor 250. Other components and functionality not reflected in the schematic block diagram of FIG. 2 will be apparent in light of this disclosure, and thus it will be appreciated that other embodiments are not limited to any particular hardware configuration.

Processor 210 can be any suitable processor, and may include one or more coprocessors or controllers, such as an audio processor or a graphics processing unit, to assist in control and processing operations associated with electronic device 200. Operating system 220 may comprise any suitable operating system. As will be appreciated in light of this disclosure, the techniques provided herein can be implemented without regard to the particular operating system provided in conjunction with electronic device 200, and therefore may also be implemented using any suitable existing or subsequently developed platform. Communication module 230 can be any appropriate network chip or chipset which allows for wired and wireless connection to other components of electronic device 200 and to a network, thereby enabling device 200 to communicate with other local and remote computer systems, servers, and resources. In one implementation, random access memory 240 is used to temporarily store image data 242 that is being processed, while flash memory 216 is used to store image data 280 long term. Flash memory is also used to store normalization module 290, which causes processor 210 to empirically normalize an exposure of a digital image. Both image data 242 and image data 280 may include input images and the normalized image that is output by processor 210 executing normalization module 290.

The embodiments described herein can be implemented in various forms of hardware, software, firmware, or special purpose processors. For example, in one embodiment a non-transitory computer readable medium has instructions encoded thereon that, when executed by one or more processors, cause one or more of the exposure normalization methodologies described herein to be implemented. The computer readable medium can be integrated into a digital camera or an electronic device including a digital camera, such as a smartphone, as in flash memory 216 of device 200 of FIG. 2. The instructions can be encoded using any suitable programming language.

The functionalities disclosed herein can optionally be incorporated into a variety of different software applications, including mobile applications installed on a smartphone, tablet computer, compact digital camera, digital single lens reflex camera, video camera, or other portable electronic device. The functionalities described herein can additionally or alternatively leverage services provided by, or be integrated into, other software applications, such as digital image or digital video editing software applications. The computer software applications disclosed herein may include a number of different modules, sub-modules, or other components of distinct functionality, and can provide information to, or receive information from, still other components and services. These modules can used, for example, to communicate with input and/or output devices such as a display screen, a touch sensitive surface, a printer, and any other suitable input/output device. Other components and functionalities not reflected in the illustrations will be apparent in light of this disclosure, and it will be appreciated that the present disclosure is not intended to be limited to any particular hardware or software configuration. Thus in other embodiments the components illustrated in FIG. 2 may include additional, fewer, or alternative sub-components.

Figure 3:
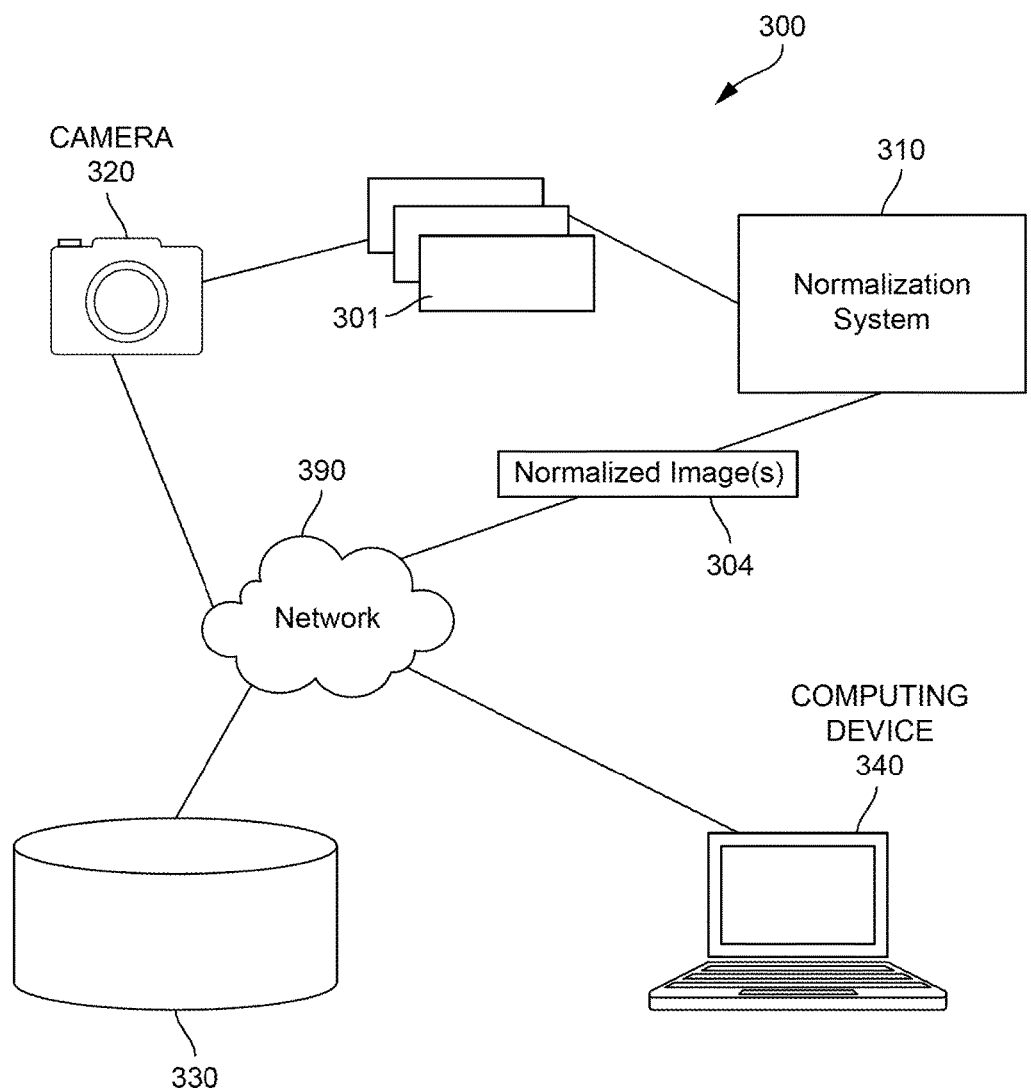
FIG. 3 is a diagram depicting an example of an environment in which an exposure normalization system is practiced, according to certain embodiments.

FIG. 3 is a diagram of an exemplary environment 300 in which one or more embodiments of the present disclosure are practiced. The environment 300 includes an image normalization system 310, configured to produce normalized digital images, and a camera, such as camera 320. In some embodiments, the environment 300 also includes one or more of network 390, a digital storage device, such as storage device 330, and a computing device, such as computing device 340. In certain embodiments, one or more of these elements are included by another of the elements. For example, the camera 320 includes the normalization system 310. Additionally or alternatively, computing device 340 includes one or more of normalization system 310, storage device 330, or camera 320.

In an embodiment, camera 320 provides a set of images 301 to a normalization system 310. In some cases, image set 301 includes digital images captured with different exposure values. The image set 301 is provided via one or more of (without limitation) an internal device connection, network 390, a portable storage device (e.g., a memory key, a digital media card), or using any suitable technique. In some cases, various individual images within set 301 are provided using various different techniques. The normalization system 310 performs one or more techniques as described herein to provide empirical normalization of a digital image, and provides an empirically normalized digital image or empirically normalized digital image 304.

The normalization system 310 can produce the empirically normalized digital image 304 (and may provide other images instead of or in addition to the empirically normalized digital image, such as an HDR photograph made using the empirically normalized digital image) to one or more receiving devices. The empirically normalized digital image 304 is provided via one or more of (without limitation) an internal device connection, network 390, a portable storage device (e.g., a memory key, a digital media card), or using any suitable technique. In some embodiments, the receiving device is camera 320. Additionally or alternatively, the receiving device is one or more of camera 320, computing device 340, or storage device 330. In some cases, the empirically normalized digital image 304 is provided to various receiving devices using various techniques. For example, camera 320 receives empirically normalized digital image 304 via an internal device connection, and storage device 330 receives empirically normalized digital image 304 via network 390.

Any suitable computing system or group of computing systems can be used for performing the operations described herein. For example, a processor executes computer-executable program code of the normalization system or module. Examples of processor include a microprocessor, an application-specific integrated circuit ("ASIC"), a field-programmable gate array ("FPGA"), or other suitable processing device. The processor includes any number of processing devices, including one. A memory device for storing the computer program instructions and digital images includes any suitable non-transitory computer-readable. The computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other non-transitory medium from which a processing device reads instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Figure 4:
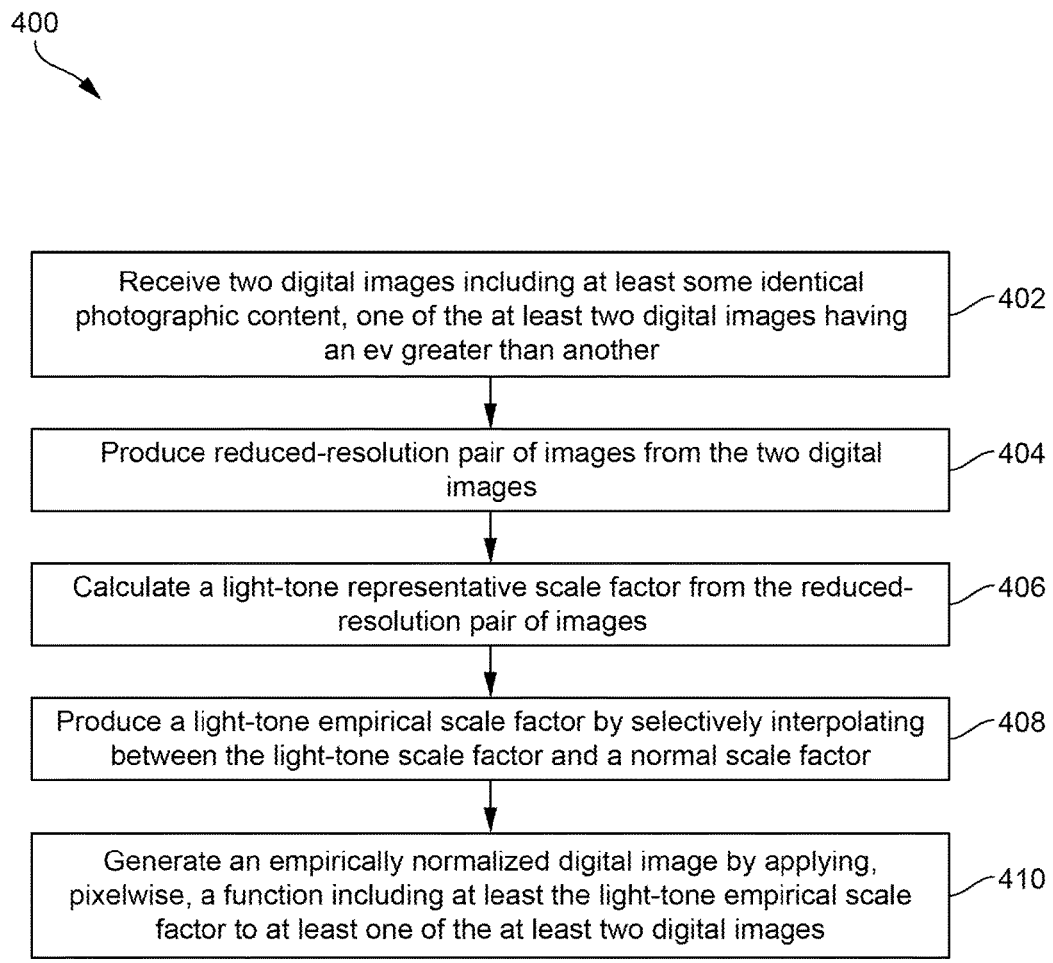
FIG. 4 is a flowchart depicting an example process for empirical exposure normalization, according to certain embodiments.

FIG. 4 is a flowchart depicting an example of a process 400 for empirically normalizing the exposure of an image, with a computing device carrying out the process by executing suitable program code. At block 402 of FIG. 4, two digital images are received. One of the two digital images has an exposure value that is greater than the other. The two digital images include at least some identical photographic content. At block 404, a reduced-resolution pair of images is produced from the two digital images. At block 406, the processing device calculates a light tone representative scale factor from the reduced-resolution pair of images. At block 408, a light-tone empirical scale factor is produced by selectively interpolating between the light-tone representative scale factor and a normal scale factor. At block 410, the processing device generates an empirically normalized digital image by applying, pixelwise, a function including at least the light-tone empirical scale factor to the darker image.

The input images must be in the same color space, and this color space must be linearly related to the sensor. That is, for any pixel, scaling the incident light at the sensor site(s) from which its color is calculated results in that pixel being scaled by the same amount, assuming no deviations due to noise or non-linearities in the sensor at very low or very high light levels. For example, in a JPEG image created by a camera the pixels would typically be the result of applying non-linear processing to the demosaiced sensor values, such as white balancing, brightness/contrast adjustment and gamma encoding, collectively known as the camera response function. In order for the JPEG pixels to be linearly related to the sensor, such that exposure normalization as described here can be done, the inverse camera response function would need to be applied.

Figure 5:
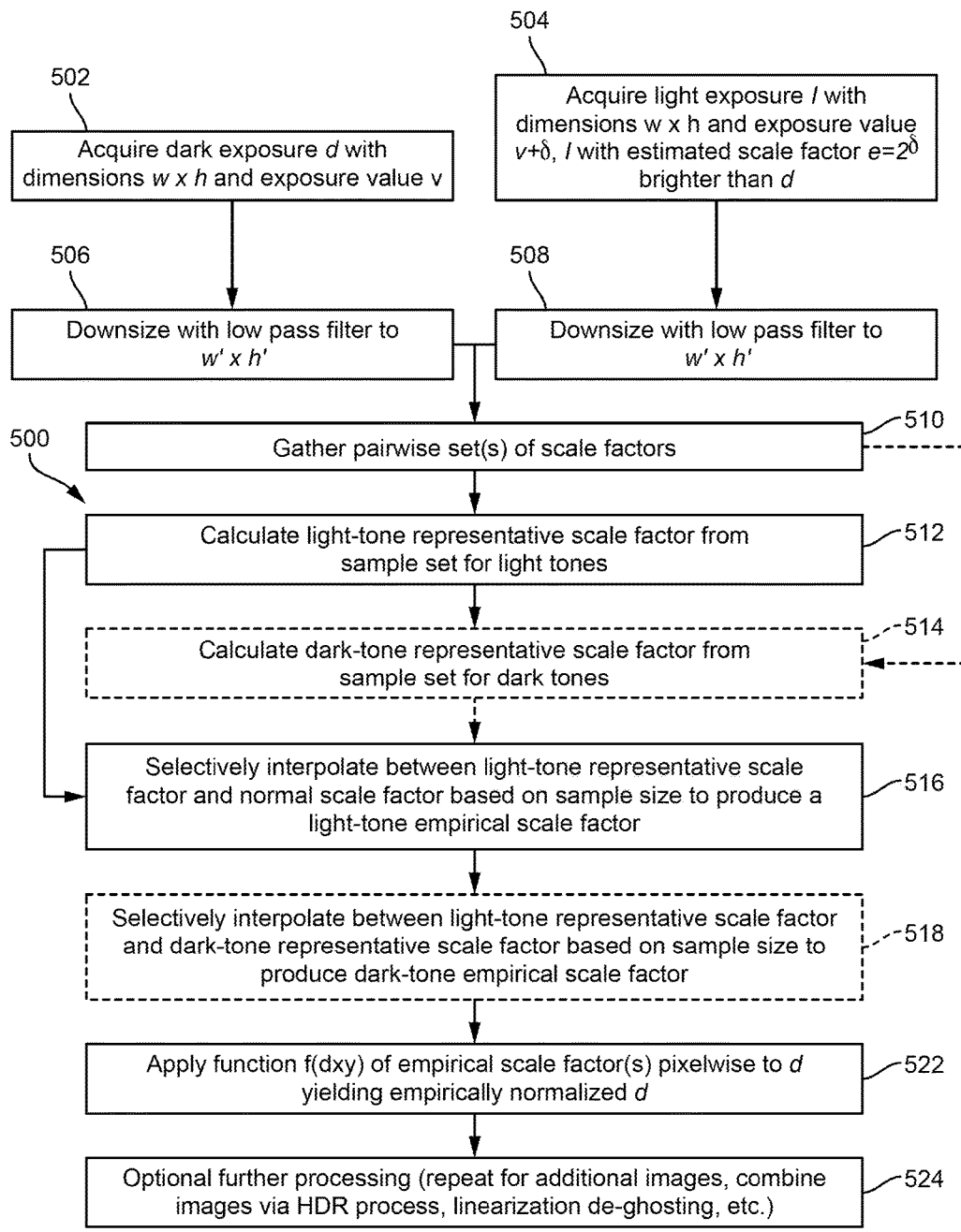
FIG. 5 is a flowchart depicting an additional example process for empirical exposure normalization, according to certain embodiments.

FIG. 5 is a flowchart depicting a detailed example of a process 500 for empirically normalizing the exposure of an image, with a computing device carrying out the process by executing suitable program code. For illustrative purposes, the process 500 is described with reference to examples depicted here. Other implementations are possible. At block 502, one of two digital images, a dark exposure d with dimensions w×h, is acquired. The digital images that are input to the normalization process or system are acquired by an image sensor in a computing device such as electronic device 200 of FIG. 2, or by a dedicated camera such as camera 320 of FIG. 3.

At block 504 of FIG. 5, another of the digital images, a light image l, with the same dimensions w×h, is acquired. The light image has an ev that is greater than the ev of the dark image. In this example, if the dark image has an ev of v, the light image has an ev of v+δ. Thus a normal scale factor e that might be used in a typical HDR process would produce l that is e brighter than d, where $e=2^\delta$. Such a scale factor is normally determined with reference to exposure information in EXIF data. The two digital images include at least some identical photographic content. Typically, such images are captured one after another (possibly with additional images) while photographing a scene that is mostly stationary, such as with a typical HDR technique. In such a case, the photographic content could be set to be substantially identical. By substantially identical, what is meant is that the images appear identical other than ev, minor alignment differences that can be effectively corrected with typical warping techniques, or the presence of a moving subject that can be removed or made to look clear and focused with typical de-ghosting techniques.

At blocks 506 and 508, the two digital images are filtered to produce a pair of reduced-resolution images. In this example, a new image of size w'×h' is produced for each of the original digital images. The lighter image of the pair of reduced images can be designated as l' and the darker image of the pair of reduced images can be designated d'. While this portion of process 500 may be referred to as "filtering" the digital images to produce a reduced-resolution pair of images because the act of reducing the resolution of an image is sometimes referred to as low-pass filtering, there are many ways pixels of an image can be "grouped." Basically any method that groups some number of adjacent pixels of the original by averaging or a similar technique into a value for a single pixel that is stored in memory can be referred to as filtering to produce a reduced pair of images, even if electronic filtering is not technically used and even if files representing each reduced-resolution image in its entirety are not actually stored. In addition to being used so that fewer "pixels" need to be involved in exposure calculations, reduced images d' and l' are used for calculating a representative color for the neighborhood around each pixel in d and l.

It has been found that a good reduction factor to use for the reduced-resolution digital images for example implementations is between 5 and 25 times, depending on how large the original images are. As an example, the techniques described herein have been applied where the original digital images are 12 megapixel images from a mobile phone camera and the reduced-resolution pair of images includes 2.2 megapixel images, a reduction factor of about 5.5. Large photos from modern DSLR and digital medium format cameras can require a reduction factor of 20 to 25 times. Higher resolution images of the future will require greater reduction factors.

Still referring to FIG. 5, at block 510, at least one pairwise set of scale factors is gathered from the reduced-resolution images. In one example, two pairwise sets are gathered. A first pairwise set $S_1$ defines scale factors for light tones and a second pairwise set $S_0$ defines scale factors for dark tones. Thus, tonal values from both images are used, as shown below:

$$S_1 = \{\text{lum}(l'_{xy})/\text{lum}(d'_{xy}) | \text{inrange}(d'_{xy}, l'_{xy}) \text{ AND lum}(d'_{xy}) \succ \tau\}$$

$$S_0 = \{\text{lum}(l'_{xy})/\text{lum}(d'_{xy}) | \text{inrange}(d'_{xy}, l'_{xy}) \text{ AND lum}(d'_{xy}) \succ \tau\},$$

where $i_{xy}$ is a pixel at location (x, y) in image i. The range of x and y is [0,1], where 0 maps to the first pixel and 1 maps to the last pixel of each respective dimension in i. When resolving $i_{xy}$ to an actual pixel, it can be assumed some filtering is applied, for example bilinear filtering. $\tau$ is a camera sensor dependent parameter that indicates the luminance threshold of the image sensor for dark tones. That is, the luminance after which at higher luminance the sensor response is at least approximately linear. In this example, the parameter $\tau$ is used to eliminate some sets of pixels from being used in the remaining calculations. lum(p) is the linear measure of the luminance of pixel p and inrange(p,q) occurs where undersaturated(p) AND undersaturated(q) AND lum(q)/lum(p)<$\lambda$e AND lum(q)/lum(p)>e/$\lambda$. $\lambda$ is a tuning parameter in [1,∞), which dictates to what extent sampled scale factors can deviate from the estimate e. The use of this tuning parameter helps avoid bad samples due to ghosting between the images. undersaturated(p) is true if and only if all channels are undersaturated for pixel p. A tuning parameter of 0.001 has been found to produce good exposure normalization. However, a good tuning parameter for a particular imaging setup can be determined iteratively by beginning with a value such as this one and determining when good normalization is achieved. If the guess is too high, one finds that the shadows get scaled too much. If the guess is too low, one ends up with a light-tone empirical scale factor that is too low (assuming there are lots of shadows). For a 16-bit image (0.65535), 0.001 demarcates tones on either side of 66.

Still on FIG. 5, a light-tone representative scale factor is calculated for the pairwise sample set for light tones at block 512. In one example, a dark-tone representative scale factor is calculated for the pairwise sample set for dark tones at block 514. The use of two representative scale factors is optional as will be discussed in further detail at the end of the discussion of FIG. 5 herein. In this example, the statistical median of the sample set for light tones is used for the light-tone representative scale factor $\eta_1$ and the statistical median for of the sample set for dark tones is used for the dark-tone representative scale factor $\eta_0$.

At block 516, process 500 selectively interpolates between the light-tone representative scale factor $\eta_1$ and a comparative scale factor to produce an updated value for $\eta_1$, which can then be referred to as a light-tone empirical scale factor. In this example, the comparative scale factor is the normal scale factor e. By "selectively interpolate" what is meant is that interpolation is performed, or not, depending on the number of good samples from the corresponding set of pairwise samples. Since some sample pairs are not considered inrange, or are eliminated using the parameter $\tau$, the number of "good" samples in the pair of reduced images varies. If the number of good samples is too small, the empirical scale factor is set to the normal scale factor e to compensate for the small number of samples. If the value is sufficiently large, the empirical scale factor keeps the value of the representative scale factor $\eta_1$. Otherwise, the value is obtained from interpolation between the value of the representative scale factor and the normal scale factor e, as shown below:

$$\eta_1 = e \text{ if } |S_1|/(w'h') \leq V_0$$

$$\eta_1 = \text{interp}(e, \eta_1, (|S_1|/(w'h') - V_0)/(V_1 - V_0)) \text{ if } V_0 < |S_1|/(w'h') \leq V_1$$

$$\eta_1 = \eta_1 \text{ if } V_1 < |S_1|/(w'h'),$$

where the function interp(a,b,t) can be any standard interpolation function, which interpolates between a and b based on t∈[0,1]. $v_0$ and $v_1$ are proportional sample sizes, which determine weights for the representative and empirical scale factors. $v_1 > v_0$.

Still referring to FIG. 5, at block 514, a dark-tone empirical scale factor can be calculated by selectively interpolating between scale factors. In this case, the system selectively interpolates between the light-tone representative scale factor, the updated value of $\eta_1$, and a dark-tone representative scale factor no at block 518 as shown below to update the value $\eta_0$ to that of the dark-tone empirical scale factor as shown below, since once calculated, $\eta_1$ is the most reliable scale factor available.

$$\eta_0 = \eta_1 \text{ if } |S_0|/(w'h') \leq V_0$$

$$\eta_0 = \text{interp}(\eta_1, \eta_0, (|S_0|/(w'h') - V_0)/(V_1 - V_0) \text{ if } V_0 < |S_0|/(w'h') \leq V_1$$

$$\eta_0 = \eta_0 \text{ if } V_1 < |S_0|/(w'h').$$

In one example, prior to applying the empirical scale factors, a version of the dark image d is produced that is smaller in resolution than d. In this example, d is downsized to d″ of size w″×h″. d″ may be larger or smaller in resolution than d′, or could be the same resolution, but will always be lower resolution than d. This version of d serves the function of allowing a representative color for a neighborhood around pixel p to be calculated for use in applying the function described below.

The empirical scale factors are then applied to dark image d at block 522 to yield an empirically normalized version of d for use in further processing, at block 524. Further processing might include repeating with additional images, combining images via HDR processing, applying a de-ghosting process, or any other process that can benefit from use of an empirically normalized digital image. In this example, the empirical scale factors are applied by defining and applying a function f pixelwise to d as shown below.

$$f(dxy) = \eta_0 dxy \text{ if } \text{lum}(d''xy) \leq t_{min}$$

$$f(dxy) = \text{interp}(\eta_0 dxy, \eta_1 dxy, (\text{lum}(d''xy) - t_{min})/(\tau - t_{min}))$$
$$\text{if } t_{min} < \text{lum}(d''xy) \leq \tau$$

$$f(dxy) = \eta_1 dxy \text{ if } \tau < \text{lum}(d''xy),$$

where $t_{min} = \min\{\text{lum}(d'_{xy})\}$.

Figure 6:
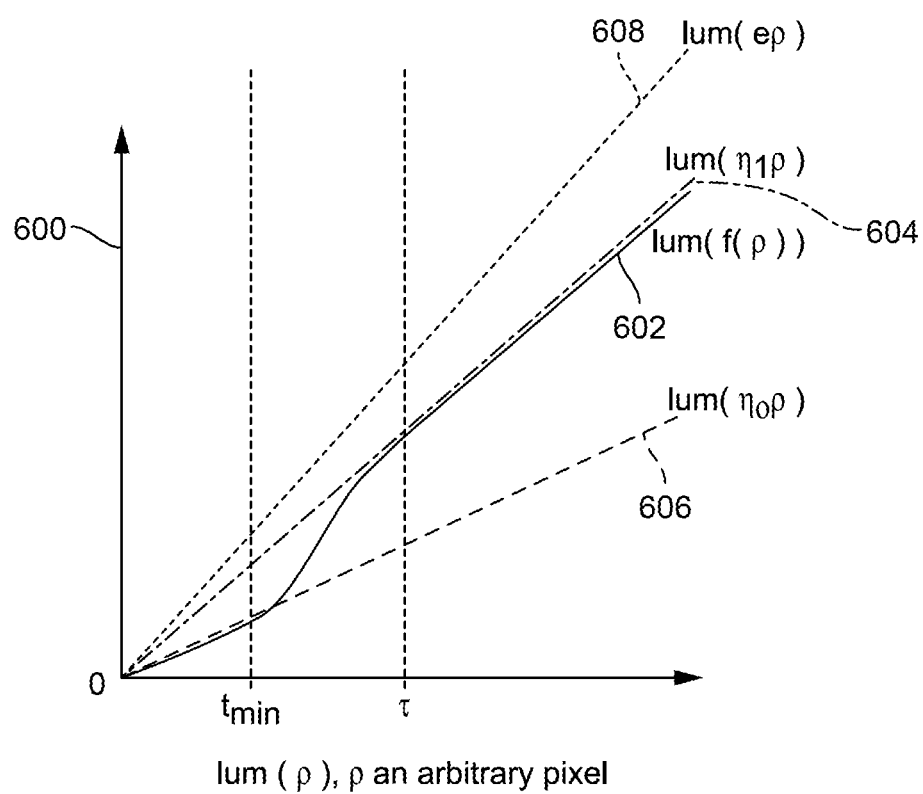
FIG. 6 is a graph illustrating various mathematical functions that can be used for empirical exposure normalization, according to certain embodiments.

FIG. 6 shows a graph 600 that illustrates the shape of function f. Line 602 in graph 600 is the shape of function f based on the equations immediately above using both empirical scale factors. Line 604 immediately above line 602 is the shape the function would take on if based only the light-tone empirical scale factor. Line 606, immediately below line 602 is the shape the function would take if based solely on the dark-tone empirical scale factor. Line 608, the highest line on the graph, shows the luminance if based on a normal scale factor determined from EXIF data. Note that after linearization, recomputing the response between the linearized dark image and the light image should now produce a mapping that if plotted would look closer 604 (where it was 602 before the linearization)—i.e. the kink at the bottom of the line is removed.

It is possible to empirically normalize an image by using only one empirical scale factor and interpolating between one representative scale factor and the normal scale factor to determine the one empirical scale factor, which would be the equivalent of the light-tone empirical scale factor discussed above. In this case, the camera sensor luminance threshold is not taken into account. Process 500 of FIG. 5 would not include the blocks in dashed lines. These results would deviate from the result of applying the function immediately above, especially at lower luminance values as shown by line 604 of FIG. 6. However, the empirically normalized digital image would still be an improvement over relying on a normal scale factor based solely on EXIF data. In this case, mathematically, since no pixel can have luminance less than zero, the set of samples for the dark tones would be empty meaning that the dark tone scale factor $\eta_0$ would be set to $\eta_1$ (during the interpolation/correction step) and hence all pixels will be scaled uniformly by $\eta_1$. It should be noted that some image formats, for example the DNG format, do support negative values, that is, values, which are less than the so-called "Blacklevel." For purposes of this disclosure it has been assumed that the images are already at least demosaiced and linearized, with pixel values greater than or equal to zero.

The process described above works with digital image pairs, and in many cases that is all that is needed since it will only be the darkest image of a group of images that needs to be corrected, in which case the two lowest ev images of the group can be used. However, the process can be applied to larger numbers of digital images by applying it pairwise more than once. The process is performed once to produce an empirically normalized digital image and then repeated wherein the pair of digital images used in the process as repeated includes the empirically normalized digital image. In such a case, the process can be applied to the higher ev of the "underexposed" images using that image and the next brightest above it to produce a normalized image for the higher ev of the underexposed images, then the previously normalized digital image would be used as the "light" image with the next lower ev of the "underexposed" images and so forth.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," and "calculating" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
receiving, by a processing device, at least two digital images, one of the at least two digital images having an exposure value that is greater than another of the at least two digital images, the at least two digital images including at least some identical photographic content;
producing a reduced-resolution pair of images from the at least two digital images;
calculating, by the processing device, a light-tone representative scale factor and a dark-tone representative scale factor from the reduced-resolution pair of images;
producing, by the processing device, a light-tone empirical scale factor by selectively interpolating between the light-tone representative scale factor and a normal scale factor; and
generating, by the processing device, an empirically normalized digital image by applying, pixelwise, a function including at least the light-tone empirical scale factor to at least one of the at least two digital images.

2. The method of claim 1 wherein the function includes a camera sensor parameter.

3. The method of claim 2 wherein the camera sensor parameter comprises a luminance threshold for dark tones.

4. The method of claim 1 wherein the normal scale factor is based at least in part on exchangeable image file (EXIF) data.

5. The method of claim 1 further comprising:
producing, by the processing device, a dark-tone empirical scale factor by selectively interpolating between the light-tone representative scale factor and the dark-tone representative scale factor to produce a dark-tone empirical scale factor;
wherein the function further includes the dark-tone empirical scale factor.

6. The method of claim 5 wherein the calculating of the light-tone representative scale factor from the reduced-resolution pair of images further comprises gathering a light-tone pairwise set of scale factors from the reduced digital images, and the calculating of the dark-tone representative scale factor from the reduced-resolution pair of images further comprises gathering a dark-tone pairwise set of scale factors from the reduced-resolution pair of images.

7. The method of claim 5 comprising repeating the method of claim 5 wherein at least one of the at least two digital images comprises the empirically normalized digital image.

8. A system comprising:
a processing device; and
a non-transitory computer-readable medium coupled to the processing device, wherein the processing device is configured to execute computer program code stored in the non-transitory computer-readable medium and thereby perform operations comprising:
receiving at least two digital images, one of the at least two digital images having an exposure value that is greater than another of the at least two digital images, the at least two digital images including at least some identical photographic content;
producing a reduced-resolution pair of images from the at least two digital images;
calculating a light-tone representative scale factor and a dark-tone representative scale factor from the reduced-resolution pair of images;
producing a light-tone empirical scale factor by selectively interpolating between the light-tone representative scale factor and a normal scale factor; and
generating an empirically normalized digital image by applying, pixelwise, a function including at least the light-tone empirical scale factor to at least one of the at least two digital images.

9. The system of claim 8 wherein the function includes a camera sensor parameter.

10. The system of claim 9 wherein the camera sensor parameter comprises a luminance threshold for dark tones.

11. The system of claim 8 wherein the normal scale factor is based at least in part on exchangeable image file (EXIF) data.

12. The system of claim 8, the operations further comprising:
producing a dark-tone empirical scale factor by selectively interpolating between the light-tone representative scale factor and the dark-tone representative scale factor to produce a dark-tone empirical scale factor; and
wherein the function further includes the dark-tone empirical scale factor.

13. The system of claim 12 wherein the operation of calculating of the light-tone representative scale factor from the reduced-resolution pair of images further comprises gathering a light-tone pairwise set of scale factors from the reduced digital images, and the calculating of the dark-tone representative scale factor from the reduced-resolution pair of images further comprises gathering a dark-tone pairwise set of scale factors from the reduced-resolution pair of images.

14. The system of claim 12, the operations further comprising repeating the operations of claim 5 wherein at least one of the at least two digital images comprises the empirically normalized digital image.

15. A non-transitory computer-readable medium storing program code executable by a processing device to perform operations, the operations comprising:
receiving at least two digital images, one of the at least two digital images having an exposure value that is greater than another of the at least two digital images, the at least two digital images including at least some identical photographic content;
producing a reduced-resolution pair of images from the at least two digital images;
calculating a light-tone representative scale factor and a dark-tone representative scale factor from the reduced-resolution pair of images;
producing a light-tone empirical scale factor by selectively interpolating between the light-tone representative scale factor and a normal scale factor; and
generating an empirically normalized digital image by applying, pixelwise, a function including at least the light-tone empirical scale factor to at least one of the at least two digital images.

16. The non-transitory computer-readable medium of claim 15 wherein the function further comprises a luminance threshold for dark tones.

17. The non-transitory computer-readable medium of claim 15 wherein the normal scale factor is based at least in part on exchangeable image file (EXIF) data.

18. The non-transitory computer-readable medium of claim 15, the operations further comprising:
producing, by the processing device, a dark-tone empirical scale factor by selectively interpolating between the light-tone representative scale factor and the dark-tone representative scale factor to produce a dark-tone empirical scale factor; and wherein the function further includes the dark-tone empirical scale factor.

19. The non-transitory computer-readable medium of claim 18 wherein the operation of calculating of the light-tone representative scale factor from the reduced-resolution pair of images further comprises gathering a light-tone pairwise set of scale factors from the reduced digital images, and the calculating of the dark-tone representative scale factor from the reduced-resolution pair of images further comprises gathering a dark-tone pairwise set of scale factors from the reduced-resolution pair of images.

20. The non-transitory computer-readable medium of claim 18, the operations comprising repeating the method of claim 5 wherein at least one of the at least two digital images comprises the empirically normalized digital image.

* * * * *